United States Patent
Yoo et al.

(10) Patent No.: US 8,437,947 B2
(45) Date of Patent: May 7, 2013

(54) SYSTEM AND METHOD FOR AUTONOMOUS VEHICLE GUIDING USING INFORMATION TECHNOLOGY INFRASTRUCTURE AND SERVER APPARATUS THEREFOR

(75) Inventors: Jaejun Yoo, Daejeon (KR); Byung Tae Jang, Daejeon (KR); Jeong Dan Choi, Daejeon (KR); Do Hyun Kim, Daejeon (KR); Jeong Ah Jang, Daejeon (KR); Kyung Bok Sung, Daejeon (KR); Jungsook Kim, Daejeon (KR); Kyeong Tae Kim, Gangwon-province (KR); Jae Han Lim, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 697 days.

(21) Appl. No.: 12/637,334

(22) Filed: Dec. 14, 2009

(65) Prior Publication Data
US 2010/0274429 A1 Oct. 28, 2010

(30) Foreign Application Priority Data
Apr. 28, 2009 (KR) .................. 10-2009-0037082

(51) Int. Cl.
*G05D 1/00* (2006.01)
*G06G 7/76* (2006.01)
*G08G 1/00* (2006.01)

(52) U.S. Cl.
USPC ................... 701/117; 701/400; 701/24

(58) Field of Classification Search .......... 701/23–26, 701/400, 409, 416, 117–119; 340/988; 342/61, 342/69–70
See application file for complete search history.

(56) References Cited

U.S. PATENT DOCUMENTS
8,175,800 B2 * 5/2012 Nakayama et al. .......... 701/410
2003/0088344 A1 * 5/2003 Oda et al. .................... 701/23

FOREIGN PATENT DOCUMENTS
| JP | 2006-301939 | 11/2006 |
| KR | 10-2006-0096237 | 9/2006 |
| KR | 10-0670164 | 1/2007 |

* cited by examiner

*Primary Examiner* — Yonel Beaulieu
(74) *Attorney, Agent, or Firm* — Staas & Halsey LLP

(57) ABSTRACT

An apparatus is for guiding a vehicle traveling of a vehicle by using information technology infrastructures. The apparatus includes: a control terminal for controlling the vehicle traveling; sensing devices that collect circumstance information of guidance areas desirous of guiding the vehicle by using the information technology infrastructures provided on the guidance areas; and a server device that recognizes a circumstance of the guidance areas to create a guidance route based on the collected circumstance information by the sensing device so that the control terminal controls the vehicle to travel along the guidance route.

9 Claims, 5 Drawing Sheets

SYSTEM AND METHOD FOR AUTONOMOUS VEHICLE GUIDING USING INFORMATION TECHNOLOGY INFRASTRUCTURE AND SERVER APPARATUS THEREFOR

CROSS-REFERENCE(S) TO RELATED APPLICATION

The present invention claims priority of Korean Patent Application No. 10-2009-0037082, filed on Apr. 28, 2009, which is incorporated herein by reference.

FIELD OF THE INVENTION

The present invention relates to a vehicle guiding apparatus and method, and more particularly, to an apparatus and method for guiding vehicle traveling from a specific starting point to a destination by using a variety of information technology infrastructures equipped on a traveling way.

BACKGROUND OF THE INVENTION

A current trend of automobile technique is studying and developing an autonomous vehicle which is intelligent to travel by itself while avoiding dangers. In this regard, many institutions, universities and companies are studying to develop the autonomous vehicle by applying a GPS (Global Positioning System) or DGPS (Differential GPS), a CCD (Charge-Coupled Device) image sensor, a laser sensor, a supersonic wave sensor and the like to a vehicle so that the vehicle is capable of recognizing and determining an outer circumstances thereof based on data obtained by these sensors. As a result of the studies, autonomous active cruise control system, autonomous lane keeping system and the like are being commercialized.

However, in general, such intelligent vehicle needs to be equipped with a sensor system of a high performance, which causes a high development cost. Further, since the sensor system applied in a vehicle provides circumstance information on a vehicle around only, self traveling considering circumstance information on a global area cannot be performed.

SUMMARY OF THE INVENTION

In view of the above, the present invention provides a vehicle guiding apparatus and method capable of controlling a vehicle to travel along a guidance route determined based on circumstance information obtained by a variety of information technology infrastructures equipped on a traveling way.

The present invention further provides a server apparatus for vehicle guiding.

In accordance with a first aspect of the present invention, there is provided an apparatus for guiding a vehicle traveling of a vehicle by using information technology infrastructures.

The apparatus includes: a control terminal for controlling the vehicle traveling; sensing devices that collect circumstance information of guidance areas desirous of guiding the vehicle by using the information technology infrastructures provided on the guidance areas; and a server device that recognizes a circumstance of the guidance areas to create a guidance route based on the collected circumstance information by the sensing device so that the control terminal controls the vehicle to travel along the guidance route.

In accordance with a second aspect of the present invention, there is provided a server device for guiding a vehicle traveling of a vehicle in communication with a control terminal installed in the vehicle. The server device includes: local servers that receive circumstance information from their corresponding sensing devices to recognize local circumstances of the corresponding areas, respectively; and a global server that recognizes a global circumstance of the guidance areas based on the local circumstances provided by the local servers to create the guidance route.

In accordance with a third aspect of the present invention, there is provided a method for guiding a vehicle traveling of a vehicle by using information technology infrastructures, the vehicle including a control terminal for controlling the vehicle traveling.

The method includes: collecting circumstance information of guidance areas desirous to guide the vehicle by using the information technology infrastructures provided on the guidance areas; recognizing an guidance route to make the vehicle to travel along the guidance route to create a circumstance of the guidance areas based on the collected circumstance information; and communicating with the control terminal to guide the vehicle traveling along the guidance route.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, embodiments of the present invention will be described in detail with reference to the accompanying drawings which form a part hereof.

Figure 1:
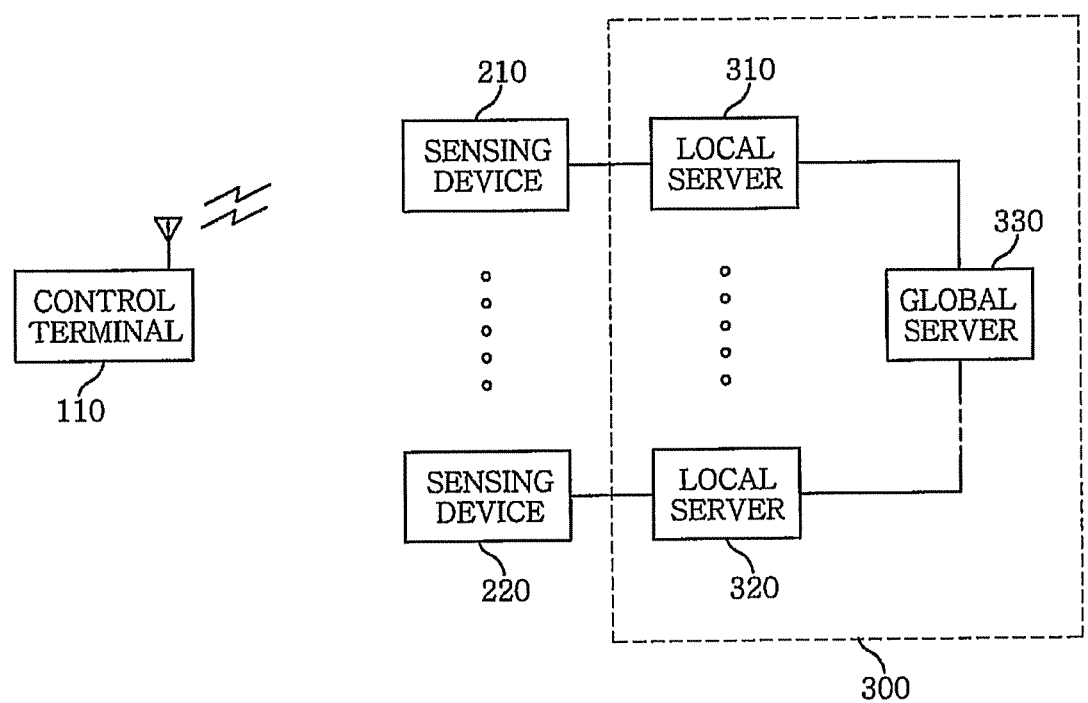
FIG. 1 illustrates a block diagram of a vehicle guiding apparatus using information technology infrastructures in accordance with an embodiment of the present invention.
Figure 2:
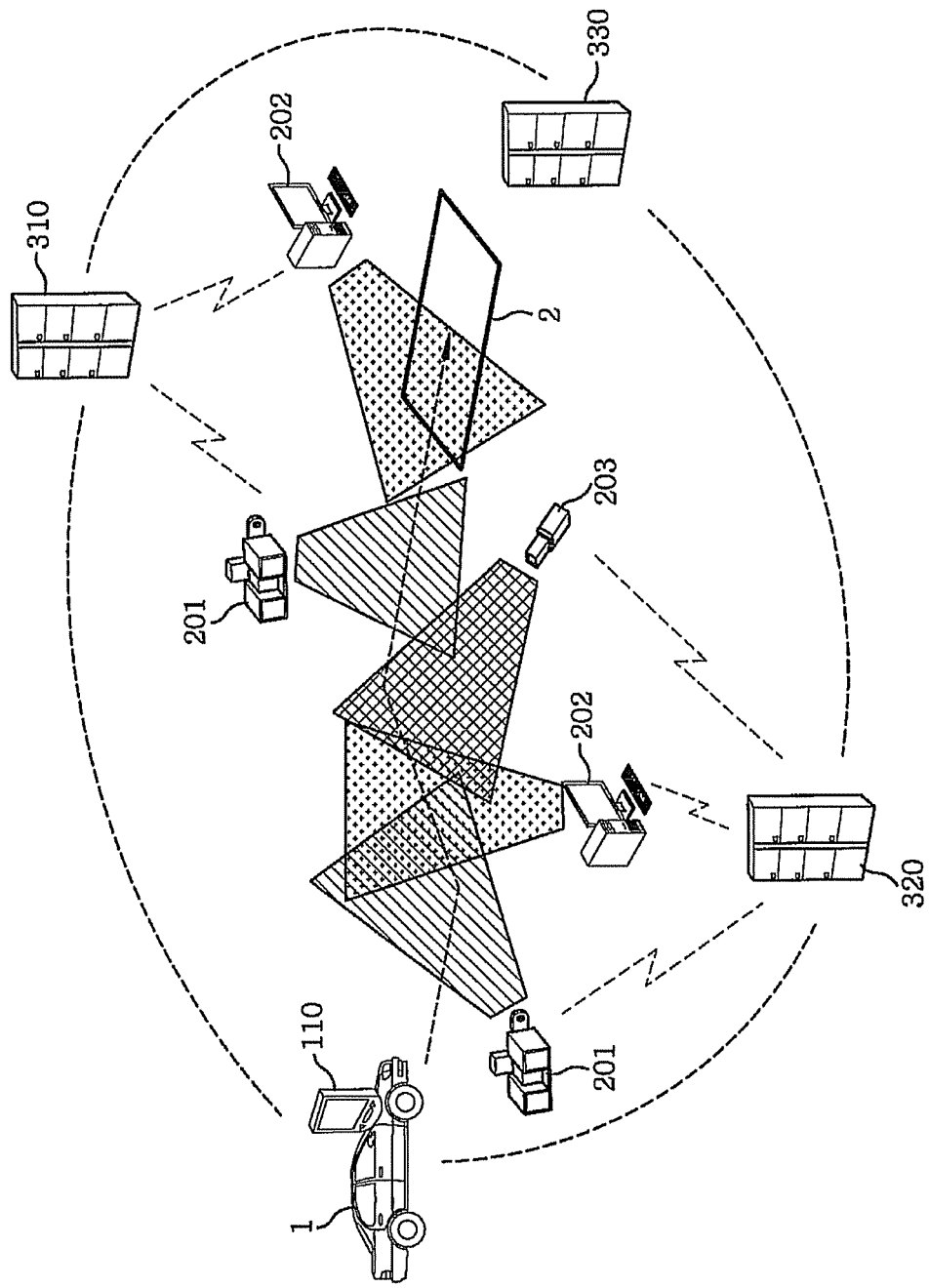
FIG. 2 is a conceptual diagram describing an operation of the vehicle guiding apparatus shown in FIG. 1.

FIG. 1 illustrates a block diagram of a vehicle guiding apparatus using information technology infrastructures in accordance with the embodiment of the present invention, and FIG. 2 is a conceptual diagram describing an operation of the vehicle guiding apparatus shown in FIG. 1.

The vehicle guiding apparatus provides to a vehicle driver a vehicle guiding service to guide a vehicle along a guidance route when he or she requires this service. The guiding apparatus includes sensing devices 210 and 220 for collecting circumstance information of guidance areas desirous of guiding a vehicle 100 by using the information technology infrastructures such as an infrared camera 201, a laser scanner 202, a CCD camera 203, a supersonic sensor (not shown) and the like which are provided in associated with the guidance areas. The sensing devices 210 and 220 are located in relation to the guidance area to obtain the circumstance information of the corresponding areas, respectively. Further, the vehicle 100 includes a control terminal 110 for controlling the vehicle traveling.

The vehicle guiding apparatus further includes a server device 300 which communicates with the control terminal 110 and recognizes a circumstance of the guidance areas to create a guidance route to make the vehicle to travel thereal-ong based on the collected circumstance information by the sensing devices 210 and 220.

The server device 300 includes local servers 310 and 320 and a global server 330. The local servers 310 and 320 recognize local circumstances of the guidance areas based on the circumstance information from the sensing devices 210 and 220. The global server 330 provides the guidance route of the vehicle 100 based on a global circumstance of the guidance areas recognized based on the local circumstances from the local servers 310 and 320 and transmits control information for vehicle guidance corresponding to the guidance route to the control terminal 110. Then, the control terminal 110 moves vehicle 100 to a destination 200 while controlling the vehicle 100 based on the control information for vehicle guidance.

FIG. 3 to 6 are block diagrams respectively showing the control terminal 110, sensing device 210, local server 310 and global server 330 in detail.

Figure 3:
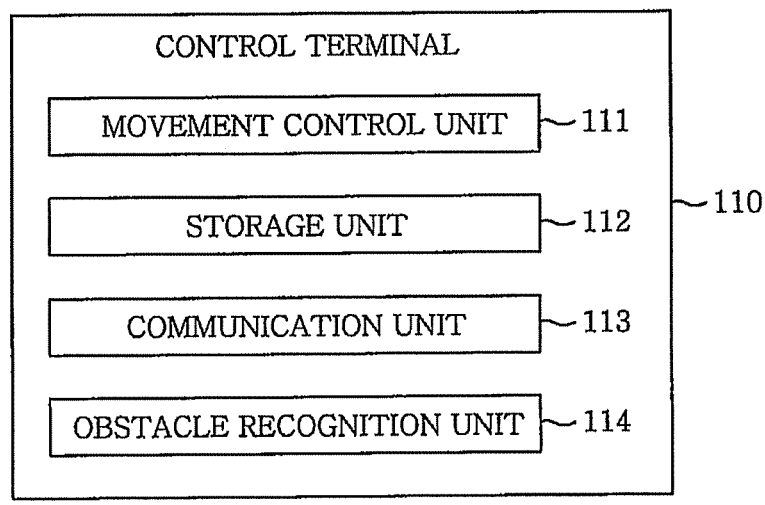
FIG. 3 is a block diagram of a control terminal in accordance with the embodiment of the present invention.
Figure 4:
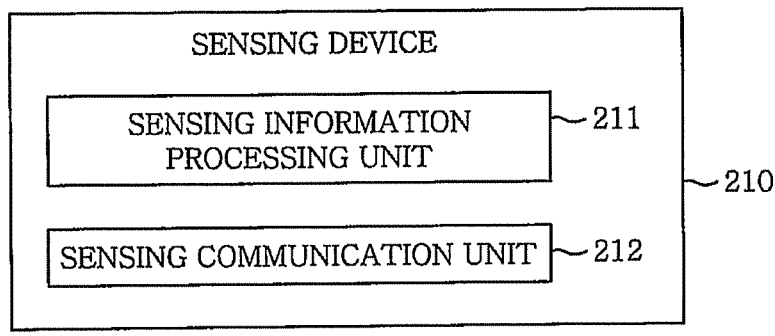
FIG. 4 is a block diagram of a sensing device in accordance with the embodiment of the present invention.
Figure 5:
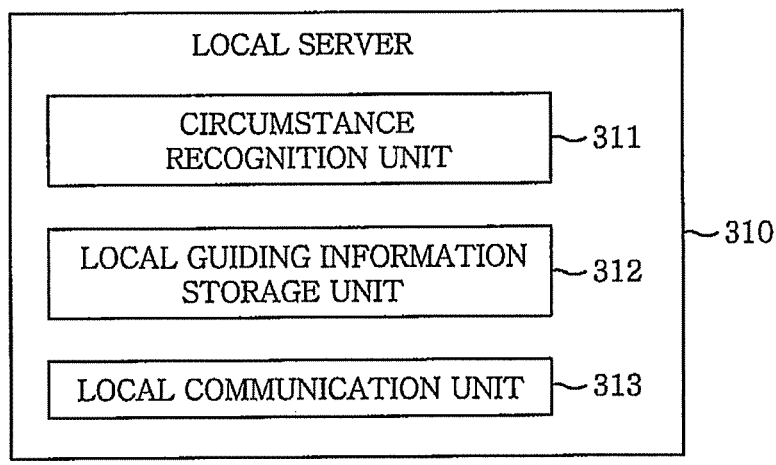
FIG. 5 is a block diagram of a local server in accordance with the embodiment of the present invention.
Figure 6:
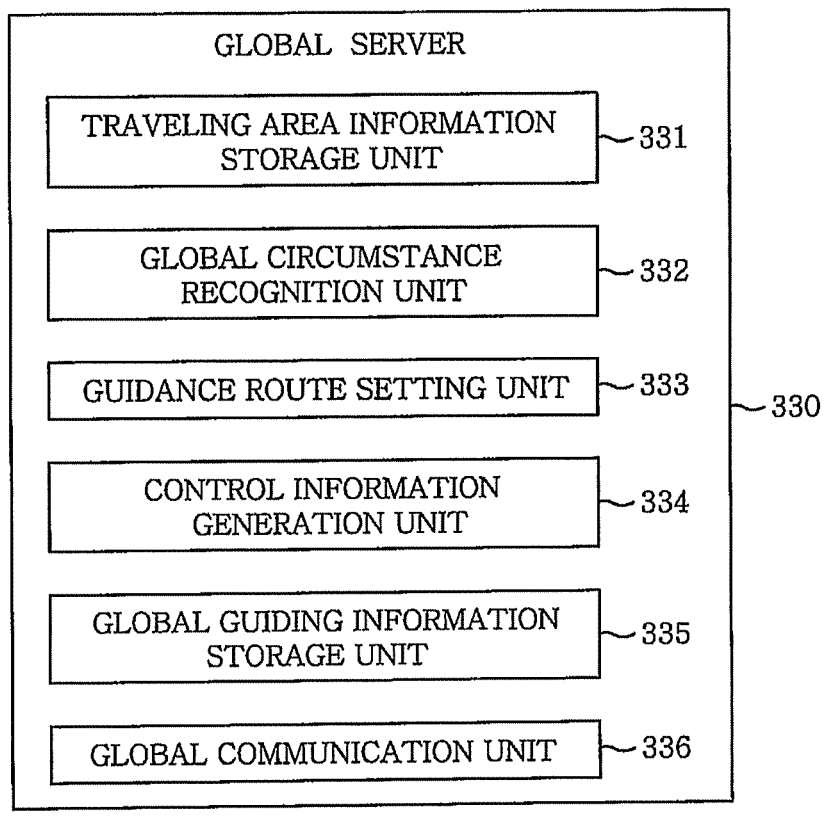
FIG. 6 is a block diagram of a global server in accordance with the embodiment of the present invention.

Referring to FIG. 3, the control terminal 110 includes a movement control unit 111, a storage unit 112, a communication unit 113 and an obstacle recognition unit 114.

The movement control unit 111 is provided with information of a predetermined format to control a movement (stop, moving, left/right direction, acceleration, retardation and the like) of the vehicle 100. The storage unit 112 stores and manages various necessary information for guiding the vehicle traveling. The communication unit 113 communicates with the information technology infrastructures provided in the traveling areas. The obstacle recognition unit 114 recognizes an obstacle encountered by an unexpected circumstance during the vehicle traveling.

Each of the sensing devices 210 and 220 includes a sensing information processing unit 211 for collecting and processing signals sensed by a sensor installed therein and a sensing communication unit 212 for transmitting the circumstance information processed by the sensing information processing unit 211 to its corresponding local server 310 or 320.

The local servers 310 and 320 each includes a local circumstance recognition unit 311, a local guiding information storage unit 312 and a local communication unit 313. The local circumstance recognition unit 311 analyzes the circumstance information transmitted from its corresponding sensing device 210 or 220 to generate local circumstance recognition information including guiding information for vehicle traveling depending on a circumstance of the corresponding region. The local guiding information storage unit 312 stores the guiding information for vehicle traveling included in the local circumstance recognition information. The local communication unit 313 provides to the global server 330 the local circumstance recognition information including the guiding information. Herein, the "guiding information for vehicle traveling" means information of an guiding circumstance, e.g., information on current position of the vehicle 100 and moving trace of the vehicle 100.

The global server 330 includes: a traveling area information storage unit 331 for storing geometrical information of the traveling areas; a global circumstance recognition unit 332 for recognizing a global circumstance of the traveling area based on the local circumstance recognition information received from the local servers 310 and 320; and an guidance route generating unit 333 for creating an guidance route of the vehicle 100 based on the global circumstance information and geometrical information of the traveling areas.

The global server 330 further includes: a control information generation unit 334 for generating the control information for vehicle guidance making the vehicle 100 to travel along the guidance route; a global guiding information storage unit 335 for storing the guiding information for vehicle traveling included in the local circumstance recognition information; and a global communication unit 336 for providing the vehicle guiding control information to the control terminal 110 or local servers 310 and 320.

Figure 7:
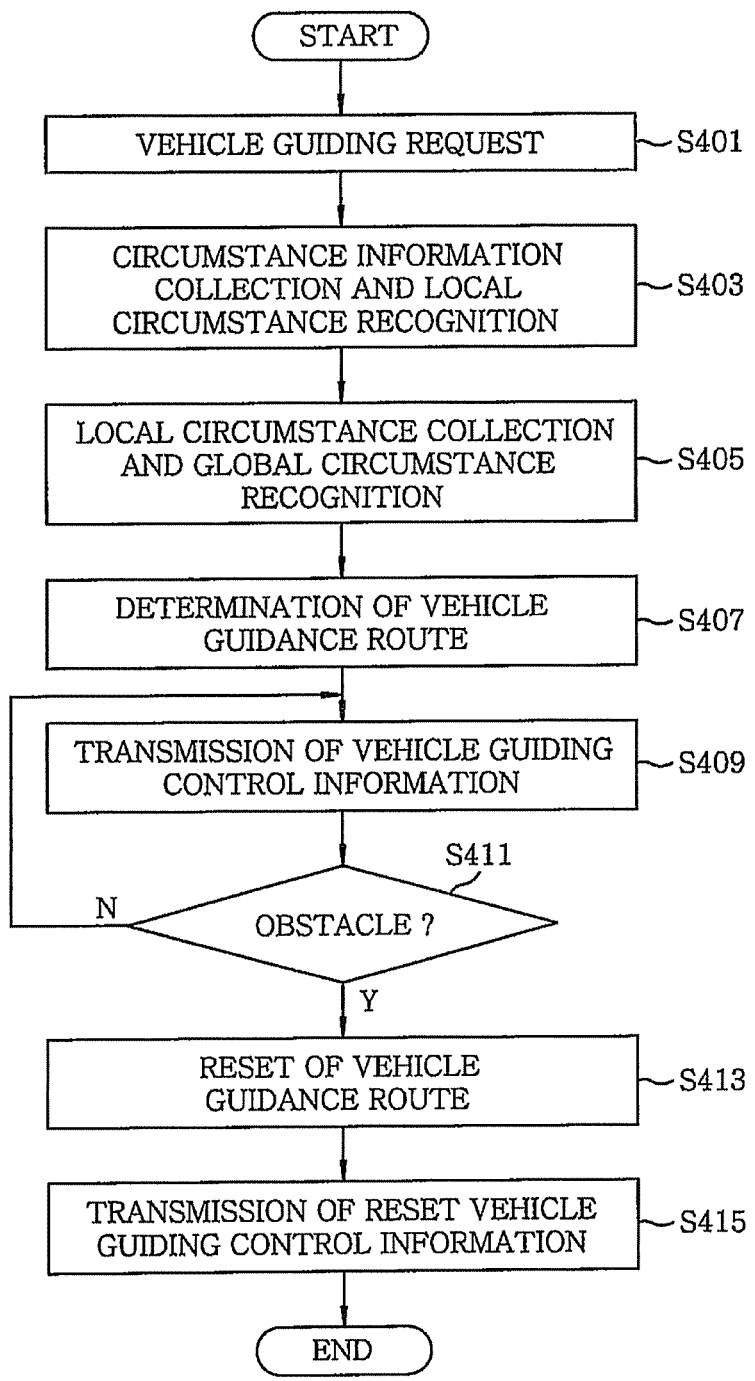
FIG. 7 is a flowchart presenting a vehicle traveling guiding process using information technology infrastructures in accordance with the embodiment of the present invention.

Hereinafter, a vehicle traveling guiding process performed by the vehicle guiding apparatus in accordance with the embodiment of the present invention will be described by referring to a flowchart shown in FIG. 7.

First, when a vehicle driver desires to be served with a vehicle guiding service, the communication unit 113 in the control terminal 110 transmits to the global server 330 information on vehicle 100 stored in the storage unit 112 to requests the vehicle guiding service at step S401.

Thereafter, the sensing information processing unit 211 in each of the sensing devices 210 and 220 collects the circumstance information of the traveling area for guiding traveling of the vehicle 100 by using the information technology infrastructures such as an infrared camera 201, a laser scanner 202, a CCD camera 203, a supersonic sensor (not shown) and the like, and the sensing communication unit 212 in each of the sensing devices 210 and 220 transmits the collected circumstance information to the local servers 310 and 320.

Upon receiving the circumstance information of the traveling area from the sensing devices 210 and 220, the local circumstance recognition unit 311 in each of the local servers 310 and 320 then analyzes the circumstance information received from the local communication unit 313 to generate local circumstance recognition information depending on a circumstance of the corresponding region. Guiding information for vehicle traveling included in the local circumstance recognition information thus generated is stored in the local guiding information storage unit 312 and the local circumstance recognition information including the guiding information is transmitted to the global server 330 by the local communication unit 313 at step S403.

When the global communication unit 336 in the global server 330 receives the local circumstance recognition information including the guiding information from the local servers 310 and 320, the global circumstance recognition unit 332 recognizes the global circumstance of the traveling area based on the local circumstance recognition information at step S405.

Then, the global guiding information storage unit 335 stores the guiding information received from the local servers 310 and 320 and the guidance route generating unit 333 creates the guidance route of the vehicle 100 based on the global circumstance and the geometrical information of the traveling area stored in the traveling area information storage unit 331 in step S407.

Next, the control information generation unit 334 generates the vehicle guiding control information making the vehicle 100 to travel along the guidance route and the global communication unit 336 provides the vehicle guiding control information to the control terminal 110 and the sensing devices 210 and 220 at step S409.

When communication unit 113 in the control terminal 110 receives the vehicle guiding control information from the global server 330, the movement control unit 111 moves the vehicle toward the destination 200 while controlling the movement (stop, moving, left/right direction, acceleration, retardation and the like) of the vehicle 100.

When the obstacle recognition unit 114 recognizes an obstacle on the guidance route during the movement of the vehicle 100, the communication unit 113 transmits to the global server 330 obstacle recognition information directly or indirectly via the local communication unit 313 at step S411.

Then, the guidance route generating unit 333 in the global server 330 receives the obstacle recognition information and reset the guidance route so that the vehicle can avoid the obstacle at step S413.

Thereafter, upon resetting of the guidance route, the control information generation unit 334 generates the vehicle guiding control information making the vehicle 100 to travel along the guidance route reset, and the global communication unit 336 transmits the vehicle guiding control information generated by the control information generation unit 334 to the control terminal 110 at step S415.

When the communication unit 113 in the control terminal 110 receives the vehicle guiding control information from the global server 330, the movement control unit 111 moves the vehicle along the guidance route toward the destination 200 while controlling the movement (stop, moving, left/right direction, acceleration, retardation and the like) of the vehicle 100 to avoid obstacles.

Meanwhile, the guidance route setting unit 333 in the global server 330 may stop the movement of the vehicle 100 when the obstacle recognition unit 114 in the control terminal 110 recognizes an obstacle on the guidance route. In this case, the global circumstance recognition unit 332 in the global server 330 periodically checks the circumstance of the global traveling area, and if a cause of an error such as the obstacle or the like is determined to be removed, the control information generation unit 334 generates the vehicle guiding control information again and transmits the information to the control terminal 110 via the main communication unit 336.

When the vehicle 100 finally arrives at the destination 200, the movement control unit 111 stops or parks the vehicle 100, and the global server 330, which has recognized the arrival of the vehicle 100 based on the global circumstance information, notifies the control terminal 110 of the end of the vehicle guiding service.

In accordance with the embodiment of the present invention, since a variety of information technology infrastructures equipped on the traveling area of a vehicle is used, the vehicle can be safely guided without applying expensive sensors thereto. Further, not only a circumstance just around the vehicle, but also a circumstance of a global traveling area may be considered to prepare for a specific incident, and the vehicle may more effectively guided. Further, it is understood that the present invention may serve a plurality of vehicles so that the respective vehicles are automatically guided simultaneously and effectively.

While the invention has been shown and described with respect to the preferred embodiments, it will be understood by those skilled in the art that various changes and modifications may be made without departing from the scope of the invention as defined in the following claims.

What is claimed is:

1. An apparatus for guiding a vehicle traveling of a vehicle by using information technology infrastructures, comprising:
    a control terminal for controlling the vehicle traveling;
    sensing devices that collect circumstance information of guidance areas desirous of guiding the vehicle by using the information technology infrastructures provided on the guidance areas; and
    a server device that recognizes a circumstance of the guidance areas to create a guidance route based on the collected circumstance information by the sensing device so that the control terminal controls the vehicle to travel along the guidance route,
    wherein the sensing devices are provided in relation to the guidance areas to collect the circumstance information of the corresponding areas, and wherein each of the server devices includes:
        local servers that receive the circumstance information from their corresponding sensing devices to recognize local circumstances of the corresponding, respectively; and
        a global server that recognizes a global circumstance of the guidance areas based on the local circumstances provided by the local servers to create the guidance route.

2. The apparatus of claim 1, wherein each of the local servers includes:
    a local circumstance recognition unit that analyzes the circumstance information transmitted from the corresponding sensing device to generate local circumstance recognition information indicative of the local circumstance wherein the local circumstance recognition information includes guiding information for the vehicle traveling;
    a local guiding information storage unit that stores the guiding information for the vehicle traveling included in the local circumstance recognition information; and
    a local communication unit that transmits to the control terminal and the global server the local circumstance recognition information including the guiding information.

3. The apparatus of claim 1, wherein the global server includes:
    a guidance area information storage unit that stores geometrical information of the guidance area;
    a global circumstance recognition unit that recognizes the global circumstance of the guidance area based on the local circumstance received from the local servers;
    a guidance route creating unit that creates the guidance route based on the global circumstance information and geometrical information of the guidance area;
    a control information generation unit that generates vehicle guiding control information making the vehicle to travel along the guidance route derived;
    a global guiding information storage unit that stores guiding information for vehicle traveling included in the local circumstance recognition information; and
    a global communication unit that provides the vehicle guiding control information to the control terminal and local servers.

4. A server device for guiding a vehicle traveling of a vehicle in communication with a control terminal installed in the vehicle, comprising:
    local servers that receive circumstance information from their corresponding sensing devices to recognize local circumstances of the corresponding areas, respectively; and
    a global server that recognizes a global circumstance of the guidance areas based on the local circumstances provided by the local servers to create the guidance route.

5. The server device of claim 4, wherein each of the local servers has:
    a local circumstance recognition unit that analyzes the circumstance information transmitted from the corresponding sensing device to generate local circumstance recognition information indicative of the local circumstance wherein the local circumstance recognition information includes guiding information for the vehicle traveling;

a local guiding information storage unit that stores the guiding information for the vehicle traveling included in the local circumstance recognition information; and a local communication unit that transmits to the control terminal and the global server the local circumstance recognition information including the guiding information.

6. The apparatus of claim 4, wherein the global server has:

a guidance area information storage unit that stores geometrical information of the guidance area;

a global circumstance recognition unit that recognizes the global circumstance of the guidance area based on the local circumstance received from the local servers;

a guidance route creating unit that creates the guidance route based on the global circumstance information and geometrical information of the guidance area;

a control information generation unit that generates vehicle guiding control information making the vehicle to travel along the guidance route derived;

a global guiding information storage unit that stores guiding information for vehicle traveling included in the local circumstance recognition information; and a global communication unit that provides the vehicle guiding control information to the control terminal and local servers.

7. A method for guiding a vehicle traveling of a vehicle by using information technology infrastructures, the vehicle including a control terminal for controlling the vehicle traveling, comprising:

collecting circumstance information of guidance areas desirous to guide the vehicle by using the information technology infrastructures provided on the guidance areas;

recognizing a guidance route to make the vehicle to travel along the guidance route to create a circumstance of the guidance areas based on the collected circumstance information; and communicating with the control terminal to guide the vehicle traveling along the guidance route.

8. The method of claim 7, wherein said recognizing the circumstance of the guidance area includes:

recognizing local circumstances of the guidance areas based on the circumstance information; and recognizing a global circumstance of the traveling areas based on the local circumstances to create the guidance route.

9. The method of claim 7, wherein said communicating with the control terminal includes:

transmitting control information for vehicle guiding to the control terminal so that the control terminal controls the vehicle to travel along the guidance route;

re-creating the guidance route when an obstacle is recognized on the guidance route by referring to the circumstance information during the vehicle traveling; and transmitting the re-created control information for vehicle guiding to the control terminal so that the vehicle travels along the re-created guidance route.

* * * * *